United States Patent
Kordich et al.

(10) Patent No.: US 12,064,051 B2
(45) Date of Patent: Aug. 20, 2024

(54) SINGLE SERVING POD USABLE IN A BEVERAGE FORMING SYSTEM AND METHOD OF MIXING POD CONTENTS WITH LIQUID TO DISPENSE AS A BEVERAGE

(71) Applicant: Healthy Concepts Inc., Redondo Beach, CA (US)

(72) Inventors: Brian J. Kordich, Hermosa Beach, CA (US); Arnold T. Suwarnasarn, San Marino, CA (US); Aaron J. Courdy, Pasadena, CA (US); Geoffrey A. Evans, Redondo Beach, CA (US)

(73) Assignee: Healthy Concepts, Manhattan Beach, CA (US)

( * ) Notice: Subject to any disclaimer, the term of this patent is extended or adjusted under 35 U.S.C. 154(b) by 596 days.

(21) Appl. No.: 17/125,907

(22) Filed: Dec. 17, 2020

(65) Prior Publication Data

US 2021/0177189 A1    Jun. 17, 2021

Related U.S. Application Data

(60) Provisional application No. 62/948,638, filed on Dec. 16, 2019.

(51) Int. Cl.
| | |
|---|---|
| *A47J 31/40* | (2006.01) |
| *A47J 31/46* | (2006.01) |
| *A47J 31/52* | (2006.01) |

(52) U.S. Cl.
CPC .......... *A47J 31/407* (2013.01); *A47J 31/468* (2018.08); *A47J 31/52* (2013.01)

(58) Field of Classification Search
CPC ......... A47J 31/407; A47J 31/468; A47J 31/52
See application file for complete search history.

(56) References Cited

U.S. PATENT DOCUMENTS

| | | |
|---|---|---|
| 5,731,021 A | 3/1998 | Spector |
| 6,250,506 B1 | 6/2001 | Geiger et al. |
| 8,844,426 B2 | 9/2014 | Ochoa et al. |
| 8,960,999 B1 | 2/2015 | Ochoa et al. |
| 10,136,754 B2 | 11/2018 | Smith et al. |
| 10,154,758 B2 | 12/2018 | Ochoa et al. |
| 2004/0002645 A1 | 2/2004 | Santiago et al. |
| 2009/0004335 A1 | 1/2009 | McMahon et al. |

(Continued)

FOREIGN PATENT DOCUMENTS

WO    2008138464 A1    11/2008

*Primary Examiner* — Dana Ross
*Assistant Examiner* — Joe E Mills, Jr.
(74) *Attorney, Agent, or Firm* — CHARTER IP LLC; Matthew J. Lattig

(57) ABSTRACT

In a beverage pod arranged for use in a beverage forming machine to make a beverage, the beverage pod has a container with an interior space, and with a beverage material located in the interior space. The beverage material is usable to form a beverage by interaction of the beverage material with a pressurized liquid introduced into the interior space upon initiation of a mixing process. The beverage pod further includes a turbulent flow creating structure in the interior space to cause mixing of the beverage material and pressurized liquid relative to the container, in response to a pattern of water jets exiting the turbulent flow creating structure so as to saturate and mix the beverage material.

21 Claims, 10 Drawing Sheets

(56) References Cited

U.S. PATENT DOCUMENTS

| | | |
|---|---|---|
| 2009/0311384 A1 | 12/2009 | McMahon et al. |
| 2015/0173561 A1* | 6/2015 | Foster ................ B65D 85/8043 |
| | | 215/11.1 |
| 2015/0246768 A1* | 9/2015 | Talon .................... A47J 31/002 |
| | | 426/431 |
| 2018/0029789 A1* | 2/2018 | Yip .................... B65D 85/8061 |

* cited by examiner

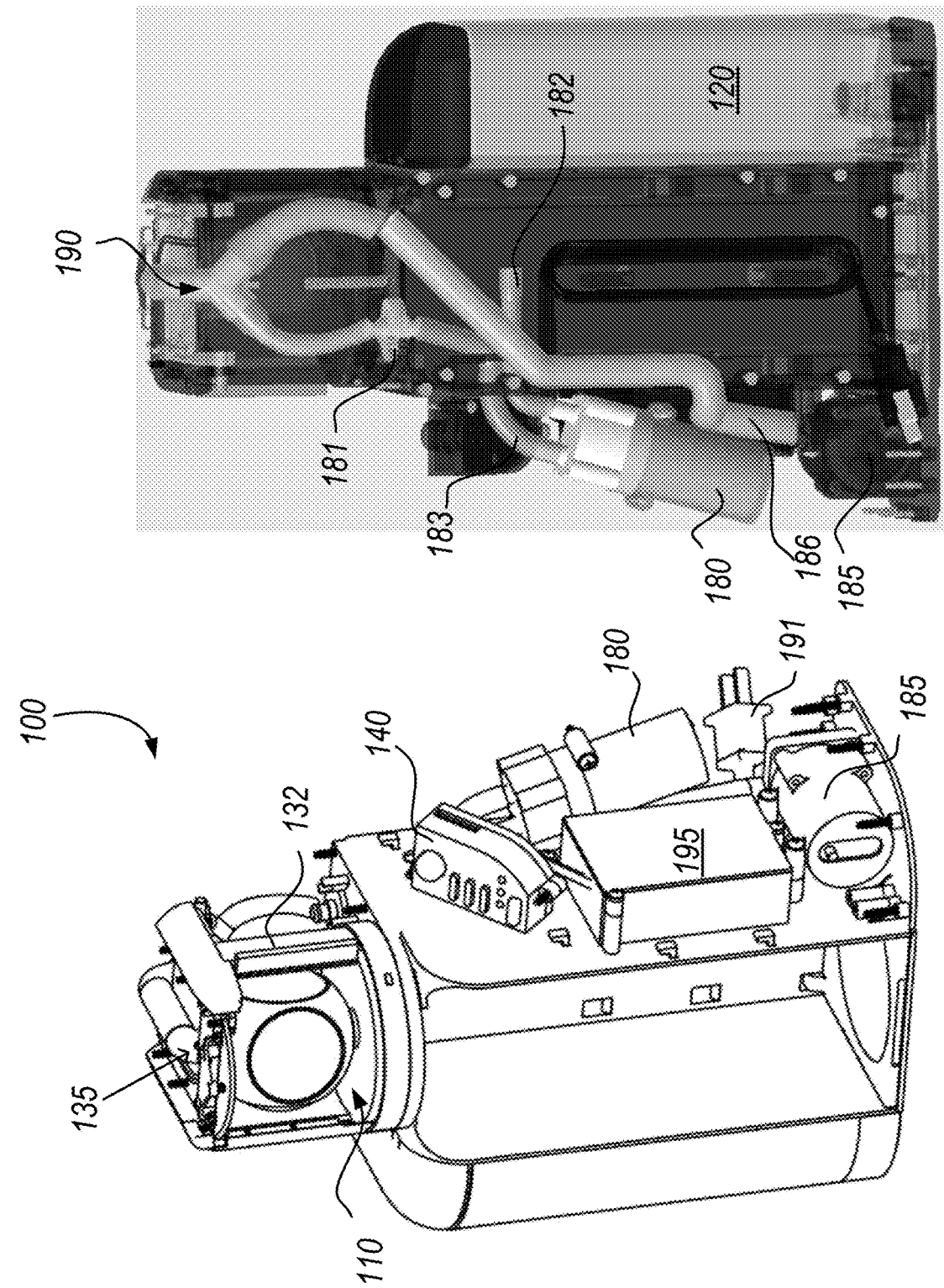

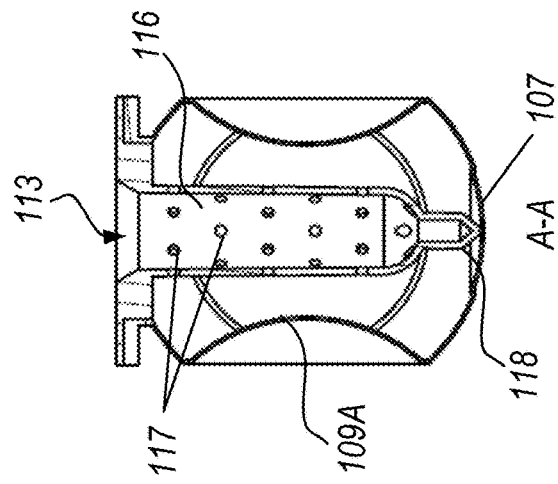
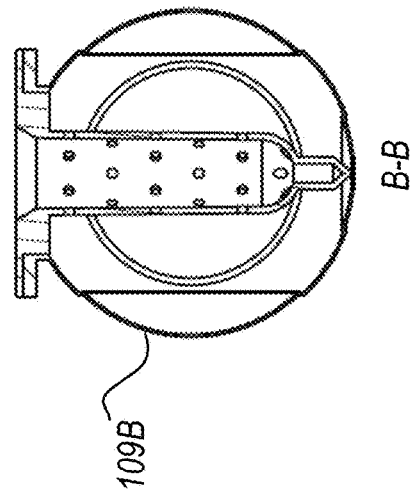
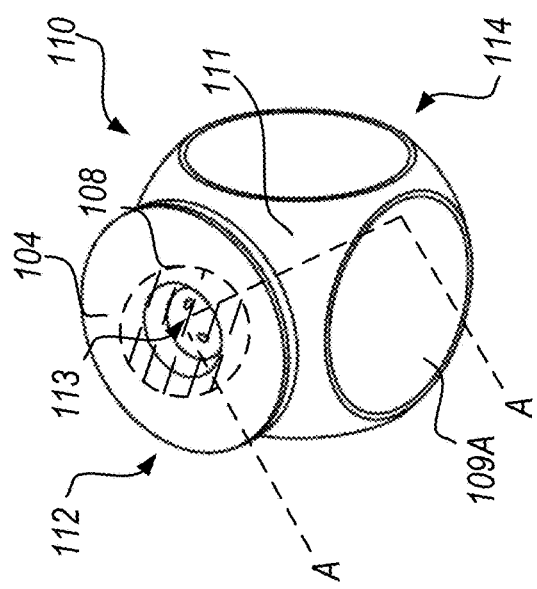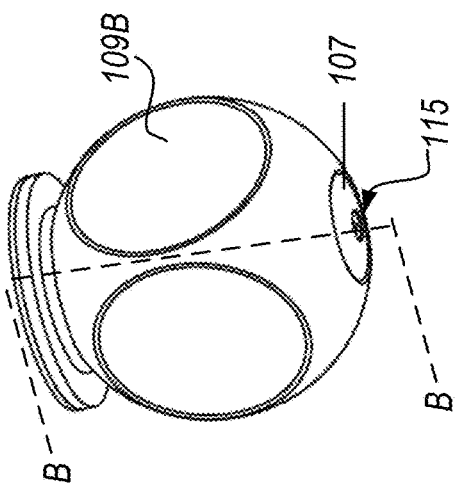

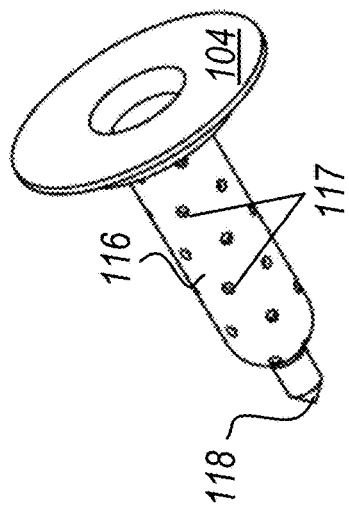
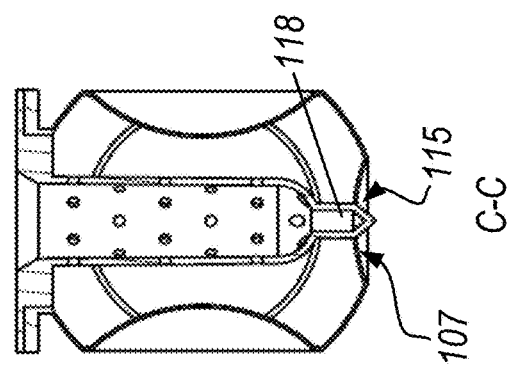
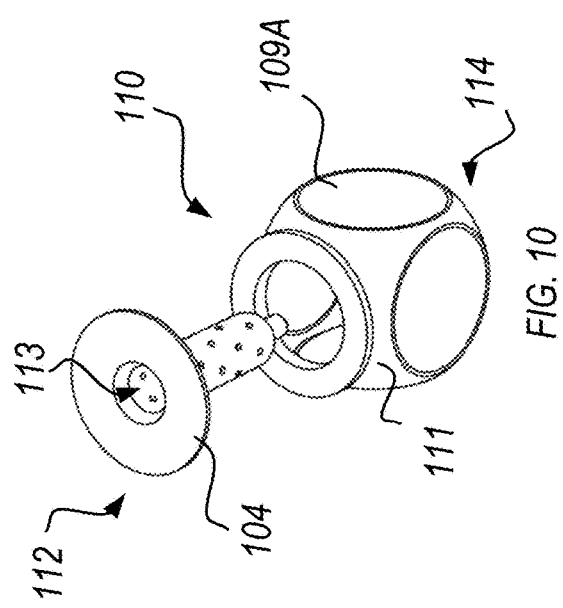
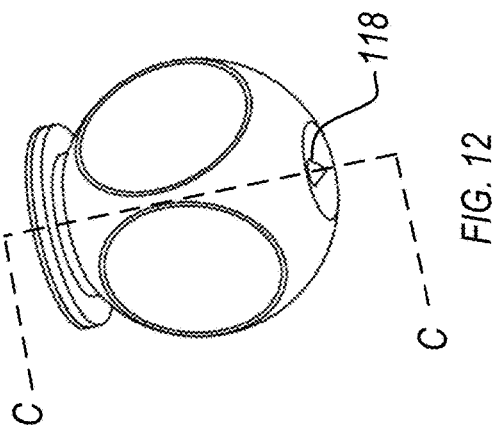

Section D-D (w/ top cover 131 closed)

Section D-D (FIG. 2)

Section D-D (w/ top cover 131 closed, front cover 132 fully closed)

Section D-D (w/ top cover 131 closed, front cover 132 almost closed)

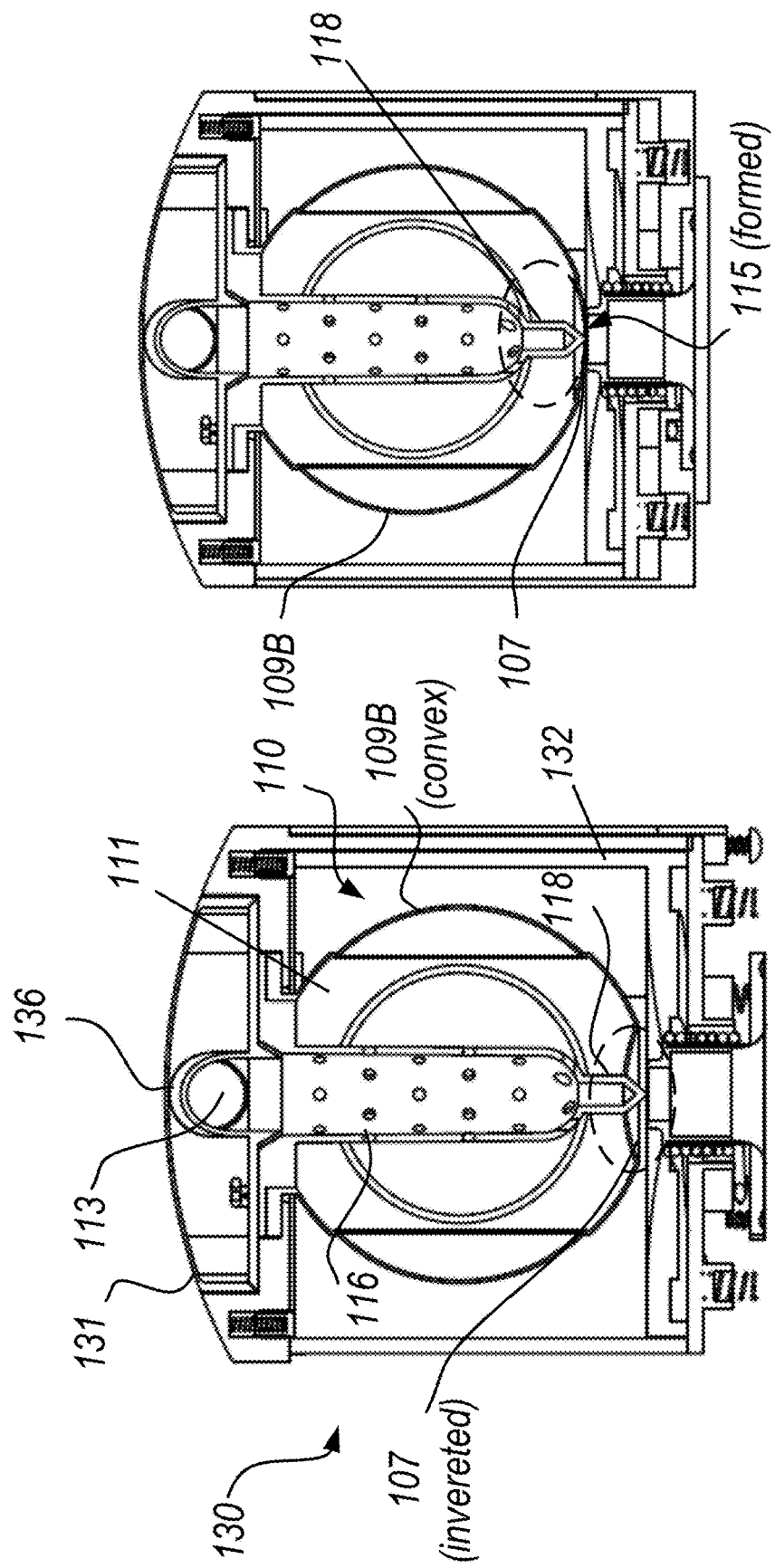

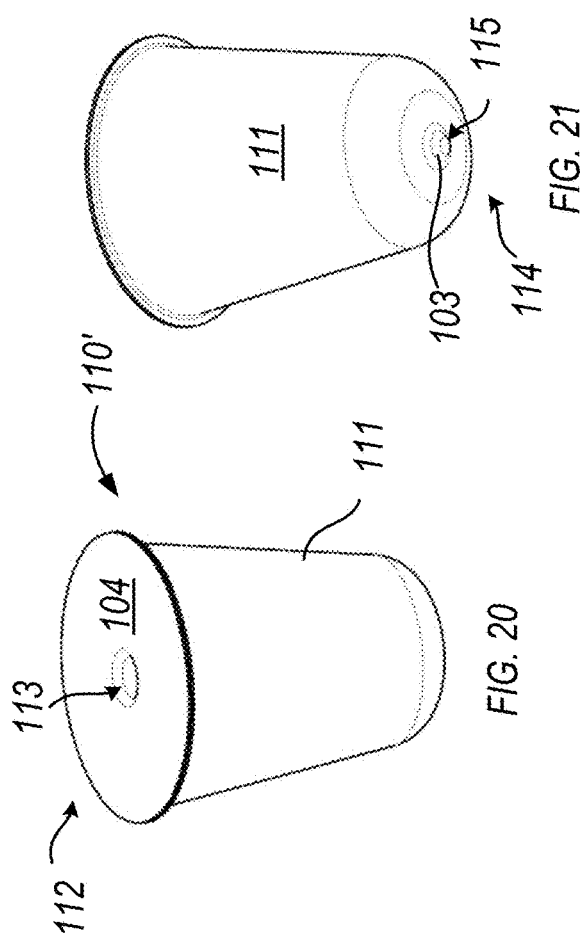
FIG. 20
FIG. 21
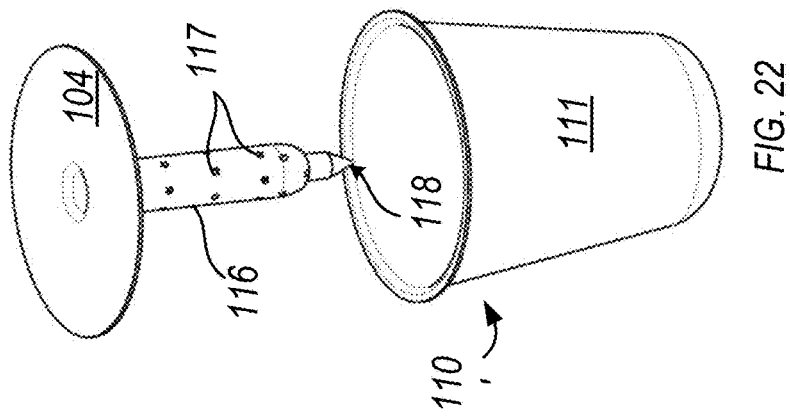
FIG. 22
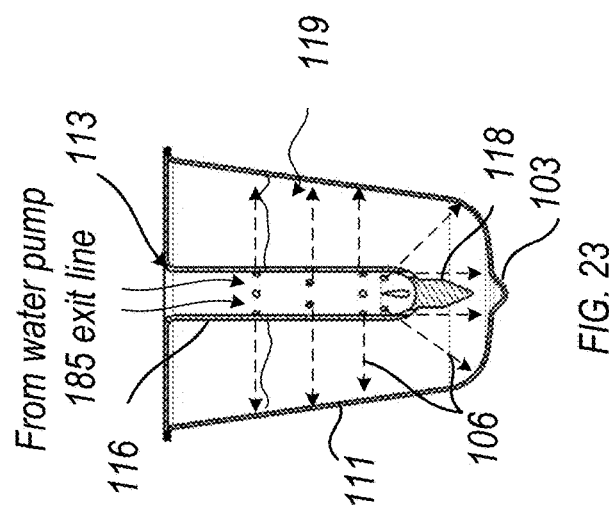
FIG. 23

SINGLE SERVING POD USABLE IN A BEVERAGE FORMING SYSTEM AND METHOD OF MIXING POD CONTENTS WITH LIQUID TO DISPENSE AS A BEVERAGE

BACKGROUND

Field

The example embodiments in general are directed to a single serving pod usable in a beverage forming system and to a method of mixing contents within the pod with pressurized liquid to dispense as a mixed beverage directly from the pod.

Related Art

Cartridge-based beverage forming systems that use a liquid, such as water, to form a beverage are well known, examples including various beverage machines (such as those known under the KEURIG® or NESPRESSO® brands) which include a cartridge holder that is adapted to receive a single-use beverage cartridge or pod containing beverage material (i.e., coffee grounds, powdered drink mix) to make the beverage. Typically, this is done by puncturing the cartridge at the top and bottom so as to introduce liquid into the cartridge to mix with the beverage material contents inside, the mixed beverage thus formed inside and exiting the cartridge or "pod" into a cup. Liquid provided to the cartridge may or may not be heated in a tank prior to delivery to the cartridge.

Protein powders contain protein and fat molecules that naturally attract and easily absorb a greater volume of fluid prior to their full-saturation point. These hydrophilic particles act differently in water than other powdered substances (such as coffee grounds and powdered sugar drinks such as hot cocoa mix). Even when anti-clumping additives and super disintegrates like lecithin, silicon dioxide, or microcrystalline cellulose are used, it can be difficult to produce a smooth consistency that is acceptable to the consumer. This is especially true when mixing a protein drink from a protein powder concentrate without using any form of mechanical agitation to remove or physically break-up the clumps that often form when mixing a protein drink.

These clumps that may form when mixing hydrophilic powders do not affect the efficacy or quality of the protein powder, but may deter consumers from enjoying the protein-based beverages enough that they will not regularly use the product. Furthermore, the process of manually mixing the protein powder with a liquid by shaking can by physically demanding, and it's difficult to tell whether all the clumps are gone when looking through a protein drink, since it is often a non-transparent suspended solution. When using mechanical agitation, the necessity to clean components used during the mixing process (e.g. a blender) is also a sufficient enough deterrent for some protein powder drink consumers. While the goal of "smooth-consistency mixing" exists for every protein powder drink made, the manufacturers of protein powder do not provide a quantitative method of assessing if "complete mixing" has been achieved. In the proposed solution, "complete mixing" is defined as mixing substantially most of the powder from the pod with some minimal residue being possibly left behind inside the pod.

FIGS. 1A through 1E illustrate photographs of a conventional, semi-cylindrical non-expanding transparent test beverage pod at different stages in a beverage mixing process of a protein powder with water and an exit of the mixed beverage out of a pod 10. Beginning with FIG. 1A, the powder contents gradually mix with an entering liquid under pressure (such as water, see FIGS. 1A-1C which show water entering pod 10 and the mixing process reaching the full saturation point in FIG. 1C). FIG. 1D shows an intermediate draining stage of the mixed beverage with the water spike removed and FIG. 1E shows the transparent test pod 10 after the mixed beverage has completely exited the pod 10.

FIG. 2 is a photograph of a similar conventional test pod after a failed test. In FIG. 2, the mixed beverage has not all exited the pod 10, and a boundary layer has formed due to improper mixing methods or pump pressure/runtime parameters.

The pod 10 shown in FIGS. 1A through 1E and FIG. 2 are representative of a typical, conventional sealed cartridge that contains beverage forming material therein, with the shape of the pod changing from a semi-cylinder to a sphere-shape in some embodiments. FIG. 2 demonstrates that the water spike and pod-shape configurations according to the conventional art are carefully refined for each powdered application, because a trivial beverage pod assembly will result in the liquid not being properly distributed within the pod, causing clumps of unmixed powder (shown in region B of FIG. 2) to form, resulting in an unsuccessful mixing process.

The clumping issue is compounded when a protein powder concentrate is contained completely within the sealed cartridge or pod for use in one of the aforementioned beverage forming systems, since they are hydrophilic particles unlike other beverage pods that are currently available. As noted, due to the nature of the composition of the hydrophilic protein powder, the powder is more prone to "clumping" within the cartridge or pod during the mixing process. As shown in FIG. 2, these clumps can often form in large pockets as the result of the creation of boundary layers (layers of saturated powder (see region A) next to large areas of non-saturated powder (see region B)).

Accordingly, when a region of powder in one portion of the pod dissolves away prematurely, it allows the incoming water to follow a path of least-resistance through the already dissolved-away internal-channel as the mixed beverage exits the pod 10. This ultimately results in an improper (or incompletely) mixed solution in the conventional beverage pod (such as is shown in FIG. 2), leaving behind completely dry (non-saturated) regions of powder that are trapped behind the saturated-powder boundary layers. Thus, what is needed is a cartridge or pod-based beverage forming system which utilizes a pod or cartridge that, without employing any mechanical agitation inside the pod, eliminates the clumping issue when mixing liquids with protein powder and/or other nutritional powders therein, permitting complete mixing of contents inside the pod and exit of all contents therefrom, providing a complete empty and recyclable pod.

SUMMARY

An example embodiment of the present invention is directed to a pod for use with a protein powder-based beverage forming system, the pod containing protein powder typically subject to clumping within the pod upon mixing the protein powder with a liquid therein. The beverage forming system includes a liquid reservoir, a liquid pump having an intake line connected to the liquid reservoir and an exit line providing pressurized liquid and connectable to the pod at a top end of a mixing chamber of the system where the pod is loaded therein for use in forming a mixed protein beverage. The pod includes a rigid body defined by a top end, a bottom end, and having a hollow interior containing the protein powder to be mixed with liquid pressurized by the liquid pump. The pod includes an elongate, hollow water vein element disposed inside the hollow interior of the body, with an upper end of the water vein element connected to an opening at the top end of the body that, when connected at the top end of the mixing chamber and upon initiation of a mixing process, provides access for the pressurized liquid to flow into the body hollow interior via the water vein element. The water vein element further includes a plurality of holes arranged in spaced relation to one another along a longitudinal plane of the water vein element from top to bottom thereof, as well as around a circumference of the water vein element from top to bottom thereof, such that the pressurized liquid flowing down through the top of the pod into the water vein element exits through the plurality of holes in a pattern of water jets, thereby creating turbulent flow to saturate the protein powder and form the mixed protein beverage while minimizing or reducing clumping thereof within the hollow interior of the pod body. An exit hole is provided in the bottom of the pod and serves as a vent path through which the mixed protein beverage vents into a cup arranged beneath the mixing chamber of the beverage forming system. The pod is not subject to any source of enhanced vibrations or agitation that is external to the pod body to induce mixing of the protein powder with the liquid therein so as to create the mixed protein beverage.

Another example embodiment is directed to a beverage forming system which includes a housing, a mixing chamber accessible on the housing for loading a pod containing beverage material therein, with the mixing chamber being connected to a source of pressurized liquid in the housing, and a platform in the housing for supporting a cup directly beneath the mixing chamber. The pod includes a body with a top end, a bottom end, and an interior space subject to pressurization from the pressurized liquid entering into the interior space via the top end of the body, with the beverage material provided in the interior space. The body further includes a water vein element extending into the interior space and having an upper end adapted to be coupled to the source of pressurized liquid at the mixing chamber, with the pressurized liquid entering through the top end of the body into the water vein element. The water vein element further includes a plurality of holes arranged in spaced relation to one another along a longitudinal plane of the water vein element from top to bottom thereof, as well as around a circumference of the water vein element from top to bottom thereof where, upon initiation of a mixing process, the pressurized liquid flows downward through the top of the pod into the water vein element and exits the plurality of holes as a pattern of water jets inducing turbulent flow so as to mix the beverage material. An exit hole is provided in the bottom end of the pod body, and serves as a vent path through which the mixed protein beverage vents downward through the interior of the pod body into the cup.

Another example embodiment is directed to a beverage pod arranged for use in a beverage forming machine to make a mixed beverage from a beverage material typically subject to clumping within the beverage pod upon mixing the beverage material with a liquid. The beverage pod includes a container having a top end, bottom end, and an interior space, where the beverage material usable to form a mixed beverage by interaction of the beverage material with a pressurized liquid introduced via the top end of the container into the interior space upon initiation of a mixing process.

The beverage pod includes a turbulent flow creating structure arranged within the interior space to cause mixing of the beverage material upon the pressurized liquid entering the interior space. Mixing occurs in response to a pattern of water jets exiting the turbulent flow creating structure into the interior space at multiple different angles and locations relative to surfaces of the turbulent flow creating structure, so as to rapidly saturate the beverage material before clumps form. The container further includes an exit hole at the bottom end thereof, the mixed beverage vented through the exit hole into a cup arranged beneath the beverage pod of the beverage forming machine.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein.

FIG. 4 is a right-side perspective view of the system of FIG. 3 with the top cover and housing removed to show interior components thereof.

FIG. 5 is a rear plan view of the system of FIG. 3 with the top cover and housing removed to show additional interior components thereof.

FIG. 6 is a top perspective view of a beverage pod (pre-expansion) for use in the beverage forming system of FIG. 3.

FIG. 7 is a cross-sectional view taken across line A-A of FIG. 6.

FIG. 8 is a perspective view of the pod of FIG. 6 to show additional details thereof.

FIG. 9 is a cross-sectional view taken across line B-B of FIG. 8.

FIG. 10 is a partial exploded parts view of the pod of FIG. 6 to show additional details therein.

FIG. 11 is a portioned view of the pod of FIG. 6 showing an upper flange ring and water vein element of the pod in more detail.

FIG. 12 is another perspective view of the pre-expansion pod of FIG. 6 after it has been pierced at its bottom by a spike of the water vein element but prior to pressurization to expand the pod into a spherical or convex shape for the mixing process.

FIG. 13 is a cross-sectional view taken across line C-C of FIG. 12.

FIG. 18 is another cross-sectional view similar to FIG. 17 to show the mixing chamber 130 once liquid has started flowing into the pod 110 from the system 100, providing enough pressure to expand the multiple concave cavities 109A of the pod, but not sufficient to return the bottom dimple 107 to its original state, dimple 107 remaining wrapped around the spike 118.

FIG. 19 is another cross-sectional view similar to FIG. 18 showing all concave cavities 109A converted to convex features 109B after pressurized expansion due to internal pod pressures, pod 110 in a state such that the mixed beverage contents herein are now able to flow out of the exit point 115 created by the spike 118 of the water vein element 116.

FIG. 20 is a perspective view of a pod 110' having non-expanding form factor according to another example embodiment.

FIG. 21 is a bottom perspective view of the pod 110' in FIG. 20 to show additional features thereof.

FIG. 22 is a partial exploded parts view of the pod 110' in FIG. 20 to show additional features thereof.

FIG. 23 is a cross-sectional view of the pod 110' of FIG. 20 to show internal components and water jet paths in more detail.

DETAILED DESCRIPTION

Figure 1A:
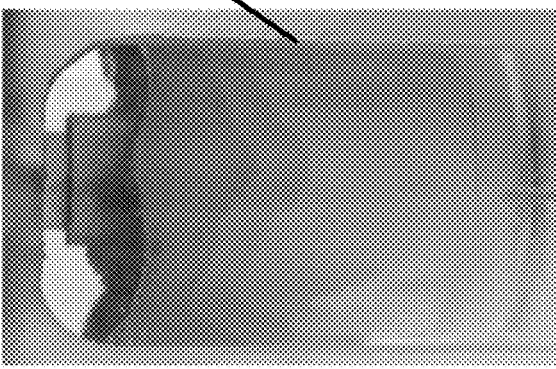
FIGS. 1A through 1E are photographs of a transparent conventional test beverage pod during stages in a test process of successfully mixing a protein powder with water to form a beverage. The water vein element has been removed during the draining process (1D & 1E) to demonstrate that incoming water has stopped.
Figure 1B:
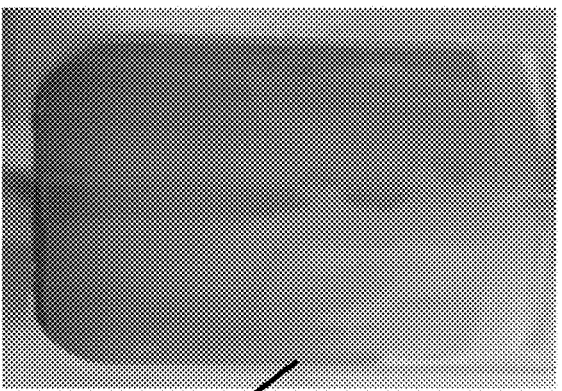
Figure 1C:
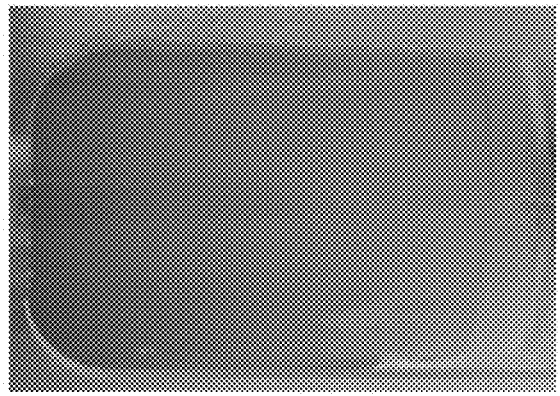
Figure 1D:
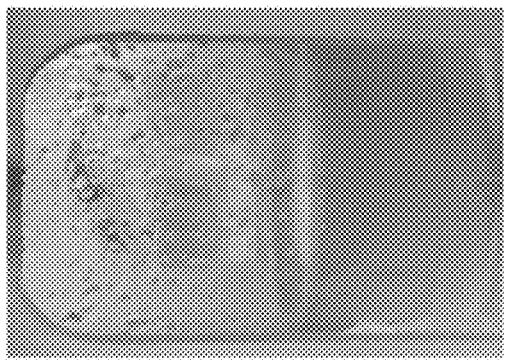
Figure 1E:
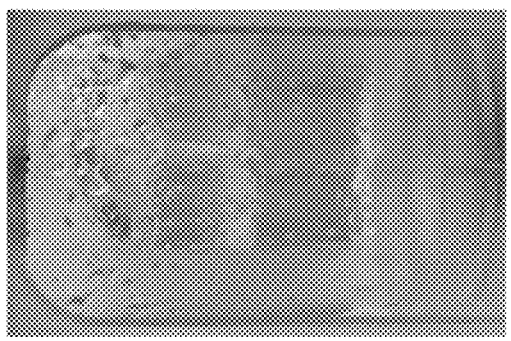

In the following description, certain specific details are set forth in order to provide a thorough understanding of various example embodiments of the disclosure. However, one skilled in the art will understand that the disclosure may be practiced without these specific details. In other instances, well-known structures associated with manufacturing techniques have not been described in detail to avoid unnecessarily obscuring the descriptions of the example embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one example embodiment" or "an embodiment" means that a particular feature, structure or characteristic described in connection with the embodiment is included in at least one embodiment. Thus, the appearances of the phrases "in one example embodiment" or "in an embodiment" in various places throughout this specification are not necessarily all referring to the same embodiment. Further, the particular features, structures or characteristics may be combined in any suitable manner in one or more example embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

As used in the specification and appended claims, the terms "correspond," "corresponds," and "corresponding" are intended to describe a ratio of or a similarity between referenced objects. The use of "correspond" or one of its forms should not be construed to mean the exact shape or size. In the drawings, identical reference numbers identify similar elements or acts. The size and relative positions of elements in the drawings are not necessarily drawn to scale.

The example embodiments hereafter describe a single serving pod usable in a beverage forming system and a method of mixing the pod contents with liquid in the system to dispense a mixed beverage to a user. Namely in one example, the system described hereafter may be embodied as a pod-based protein powder drink machine which requires minimal cleanup. Pods usable therein are fully recyclable and include powder contents therein applicable to sports nutrition, which are commonly hydrophilic in nature and usually difficult to mix smoothly without using mechanical agitation to breakup clumps that innately form.

The proposed design for a pod and beverage mixing system to be described in detail hereafter is unique due to the intended purpose of mixing hydrophilic particles (which are prone to clumping) entirely within the pod, similar to other pod-based mixing systems. This is accomplished without mechanical agitation through the use of hydrodynamic pressures, and in some cases with expandable-volume pods, instead of using mechanical agitation (like a conventional blender) to mix the beverage inside of a fixed-volume container which must then be washed and reused.

Figure 3:
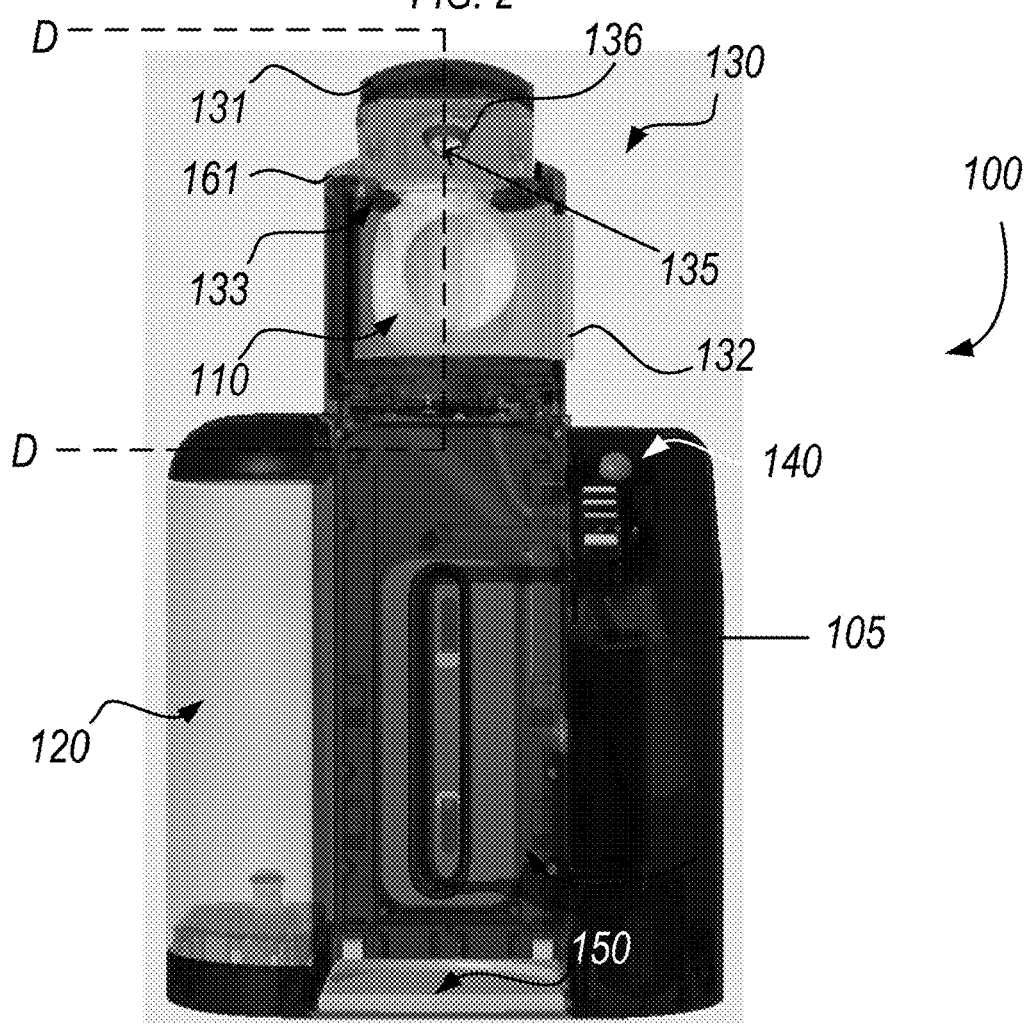
FIG. 3 is a front plan view of a beverage forming system with single serving pod according to the example embodiments.
Figure 15:
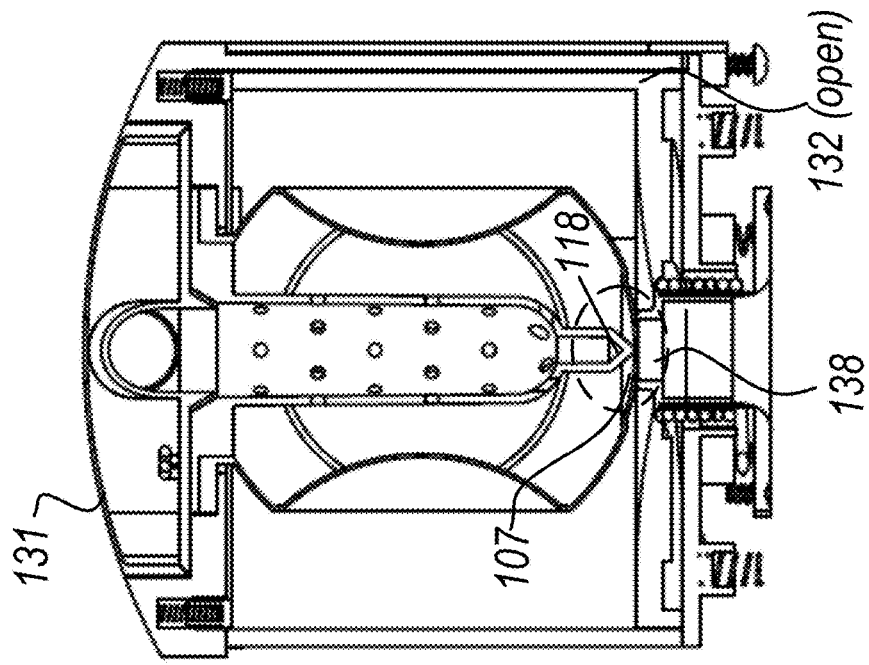
FIG. 15 is a cross-sectional view similar to FIG. 14 but with the top cover 131 show in a closed position.

Additionally as to be shown below, the expanding volume pods utilized in the beverage forming system according to the example embodiments enable the achievement of more consistent results for smooth mixing of hydrophilic powders, since allowing the powder to shift or move inside the expanding pod promotes the natural separation of powder molecules, reducing the amount of clumping observed and preventing the tendency for boundary layers to form on the pod's inside walls FIGS. 3 to 5 illustrate an example beverage forming system 100 adapted for use with the pod according to the example embodiments; FIGS. 6-13 show various features of the single use beverage pod assembly (hereafter "pod 110") used in system 100, and FIGS. 14-19 and 24-27 show specific features and operations in a mixing chamber 130 of the system 100. Occasional reference shall be made to various ones of these figures' hereafter. As seen in FIGS. 6-13 for example, pod 110 includes a container or pod body 111, top end 112, bottom end 114, and a central opening 113 through which pressurized water and air may be introduced within. Although these features shall be explained in further detail hereafter, pod 110 is expandable via internal pressurization into and through an internal water vein element 116.

Referring back to FIGS. 3-5, system 100 may include an exterior housing 105 (hereafter "housing 105") which contains or supports a removable primary reservoir 120 designed to hold or be filled with water, and an optional removable secondary reservoir (not shown) designed to hold or be filled with liquids other than water (milk, juice, other). To remove the reservoir 120 for refilling, the reservoir lid 121 is lifted and primary reservoir 120 vertically removed to separate it from housing 105.

A water pump 185 for pressurizing a liquid may be arranged in the housing 105 along with an air pump 180 that provides additional pressure and assists with the draining process. The water pump 185 may have a suction or intake line (well-known but not shown in detail) connected to the removable primary reservoir 120 (and/or to the removable secondary reservoir). As shown best in FIG. 5, the water pump 185 has an exit line 186 that is connected at its distal end to a Y-connector 190. The Y-connector 190 is what combines the air (from air pump exit line 183) and water in exit line 186 that are to about be pumped into the mixing chamber 130.

In an example, a food-grade air filter 181 may be used with air pump 180 to purify the air of particulates prior to introducing it to the water for mixing it at the base of Y-connector 190. Namely, Y-connector 190 carries the water through a top cover 131 of the mixing chamber 130 and pumps it out a fluid exit nozzle 135 into a pod entry point, shown in various figures as the aforementioned central opening 113 at the upper or top end 112 of the beverage pod 110. Once the top cover 131 is closed, through a connection established, the distal end of the water pump exit line 186 may be associated to or otherwise connectable to an upper end of a water vein element 116 at the central opening 113 in pod 110.

Loading of pod 110 may be via an access or opening in the front of the mixing chamber 130. As an example, the mixing chamber 130 could be embodied as a front-loading mixing chamber (as depicted in FIGS. 3 to 5). The mixing chamber 130 may also have a pivotable front cover 132 which not only serves the cosmetic purpose of concealing the pod 110 when closed, but which also includes internal ramps 139A (as best shown in FIG. 24) on its underside that cause the front cover 132 to be raised into contact with the bottom 114 of the pod 110, forcing the aforementioned spike at the distal end of the water vein element 116 to puncture through the bottom end 114 of pod 110, thereby creating an exit hole 115 for removal of the mixed beverage contents therein.

For a front-loaded mixing chamber such as chamber 130 to accommodate pod 110, an example construction for the mixing chamber could be as a modification of a brew chamber designed by KEURIG for their K-CUP system, namely a modification of the receptacle profile to match the pod 110 shape. In general, the pod size for mixing hydrophilic powders should be larger because these powder particles are difficult to mix and often experience higher clumping rates in smaller relative volumes, which is why an expanding-volume pod 110 is described herein.

Mixing chamber 130 may include an opening or receptacle area for the pod 110 to rest upon (hereafter "pod holder 133") with an accessible top (hence top cover 131) configured and dimensioned to receive a beverage pod 110 therein. A fixed frame for supporting the pod holder 133 is contained within mixing chamber 130, sitting on housing 105. The mixing chamber 130 can support the pod holder 133 from the top, but allows for pivotal movement about a first axis that is aligned with the center vertical axis of the pod 110 once loaded in the pod holder 133.

Figure 25:
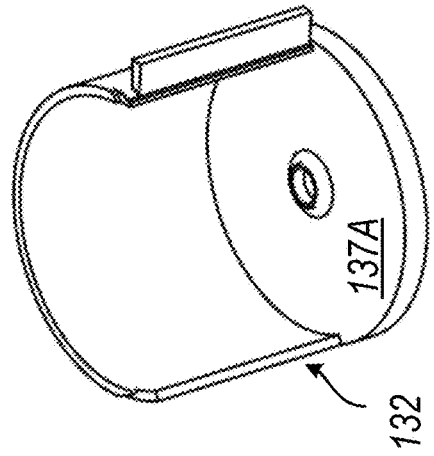
FIG. 25 is a front, down-angled perspective view of the front cover in an open orientation according to the example embodiments.
Figure 27:
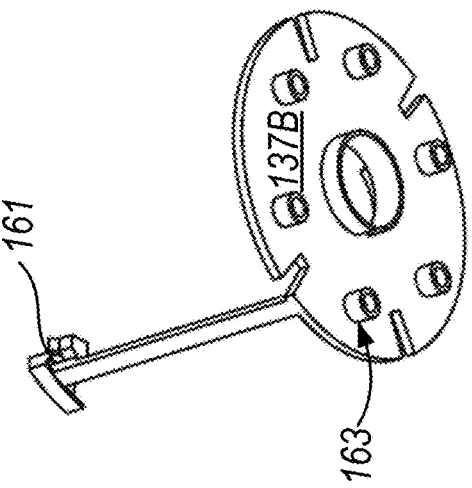
FIG. 27 is an angled bottom perspective view of the opening latch of FIG. 26 to show additional detail thereof.
Figure 24:
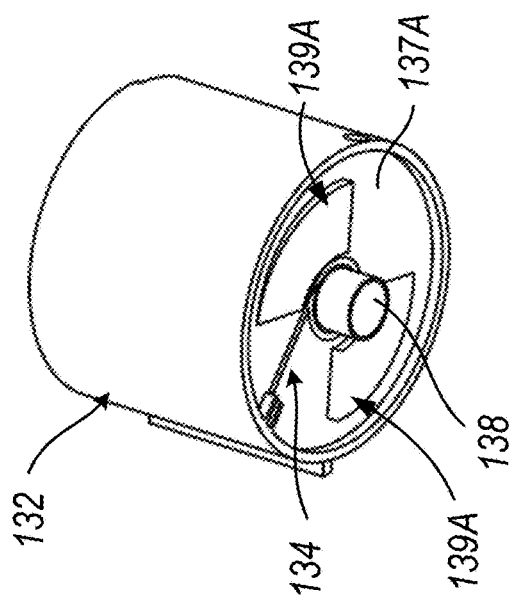
FIG. 24 is a front, up-angled perspective view of the front cover in a closed orientation according to the example embodiments, to better illustrate ramps which enable the front cover to rise in height as its door rotates to close.
Figure 26:
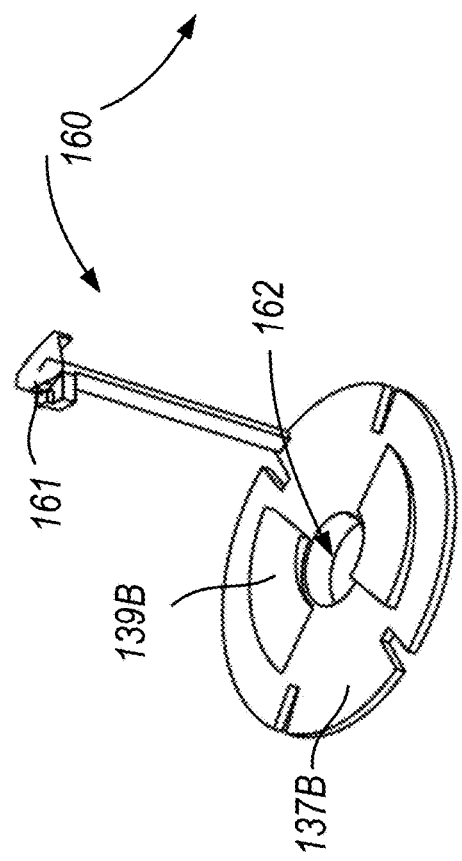
FIG. 26 is a top, angled plan view of an opening latch structure which cooperates with the top cover 131 and front cover 132.

With occasional reference to FIGS. 14-19 and 24-27, front cover 132 of the mixing chamber 130 rotates about this same axis and also has the freedom to travel vertically up and down by a small amount, driven by ramps 139A present on the underside base 137A of the front cover 132, as shown in FIG. 24. These ramps 139A are equal and opposite in shape to ramps 139B seen on a base 137B of an opening latch assembly 160, as shown in FIG. 26. Namely, the front cover 132 is mounted on a torsion spring 134 which returns it to an open position unless front cover 132 is fully closed, and it may be released by pressing on the opening latch button 161 which lowers the spring-loaded base 137B of the opening latch assembly 160 (FIG. 27 shows spring hole 163 locations), allowing the front cover 132 to swing-open and return to its fully open position. At the same time, the opening latch button 161 also releases the spring-loaded mixing chamber top cover 131 to open upward. In this way, with the press of one-button (opening latch button 161) the user can easily open both spring-loaded covers 131, 132 at once and be ready to remove the pod 110 after mixing.

Top cover 131 in an example is articulated and may be supported on the frame of housing 105 for pivotal movement about a second axis between a raised position ("open") which allows access to pod holder 133 for loading and unloading of pods, and a lowered position closing the top cover 131 down into its vertically aligned mixing position, which creates a seal between the fluid exit nozzle 135 of mixing chamber 130 and central opening 113 of the pod 110. The first and second axes may be parallel or perpendicular (as in this example) depending on the desired construction of system 100.

A linkage may be provided to connect the pod-holder 133 to the mixing chamber 130 and the top cover 131. The linkage may serve to pivotally connect the different pieces such that the user may manipulate the top cover 131 and front cover 132 between their open and closed (mixing) positions in response to movement of the top cover 131 between its raised and lowered positions, and pivotal movement of the front cover 132 from its open position to its closed position.

Referring now to FIG. 25, at the point where the front cover 132 is almost in the closed/mixing position, a cylindrical post 138 may be designed to lift the bottom end 114 of the pod 110 such that the spike 118 punctures the bottom 114 so as to create the exit point 115 as shown in various figures. As best shown in FIG. 6, to access the central opening 113 at the top end 112 of pod 110, a user must simply remove a pull-tab hermetic seal 108 (dotted line circle) that covers the central opening 113 so that access for pressurized liquid into the closed interior space of the pod 110 is provided, in preparation for a manual or automatic initiation of top cover 131 being closed, thus creating a water-tight seal with the fluid exit nozzle 135 prior to a mixing process in pod 110.

Thus, once the pod 110 is loaded in the pod holder 133 or mixing chamber 130, after top cover 131 and front cover 132 have been closed (in that order), initiation of a mixing process is possible by a user manually or automated via a control button at a control panel 140. This enables liquid from the removable primary reservoir 120 to be pressurized and ported via the water pump 185 through Y-connector 190 out fluid exit nozzle 135 and into the top of pod 110 through central opening 113.

The control panel 140 or control interface (such as an LCD panel or other button interface) is provided for system 100 operation (selecting quantities of water to dispense, such 6 oz., 8 oz., 10 oz., 12 oz., etc., initiating the mixing process, display of system indicator signals/lights, etc.) An access port to the housing 105, commonly described as a cup receptacle area 150 is provided within the housing 105 so as to place a cup or bottle therein for receiving mixed beverage contents which are exiting the mixing chamber 130 via the exit point 115 created through the bottom end 114 of the pod 110.

Incoming power to the system is provided by AC power cable 191 which can be stored in an embedded opening in housing 105 so-as to minimize its storage footprint when not in use, similar to other household appliances. AC power cable 191 supplies incoming power to the motor drive and power control PCB 195, which also receives user-inputs from control panel 140 and sends the corresponding system indicator light signals back to control panel 140 for display to the user.

Referring now to FIGS. 6 to 13, the pod 110 according to the example embodiments include a walled, hollow container or body 111 with a top end 112 connected to a water vein element 116 via a flange 104. Element 116 has a distal tip that is embodied as the aforementioned spike 118 that is intended to pierce through the bottom end 114 of pod 110 to create the exit point 115. Pod body 111 is adapted to be capable of articulating from concave form factor to a convex or spherical form factor under pressure, and in that form is punctured or vented so as to release mixed beverage contents via exit point 115 into a cup. In an example, pod 110 can be in any shape, and water vein element 116 can have different combinations of holes 117, which may be cut or formed into the body of the water vein element 116 that is within the closed interior space of pod body 111, so as to generate different spray patterns. The form factors of the pod 110 shown in FIGS. 6-13, in combination, promotes successful mixing for difficult-to-mix hydrophilic protein powders as described herein.

Central opening 113 is sealed to the fluid exit nozzle 135 and which represents an upper end of an attached or otherwise integrally-formed hollow water vein element 116 in an elongate or tubular shape. The water vein element 116 incudes the aforementioned plurality of holes 117 in spaced relation to one another along the water vein element 116 so that, once a mixing process has been initiated and the sealed central opening 113 is connected to the fluid exit nozzle 135, a pattern of water jets 106 is created due to pressurized water from the water pump 185 (and air pump 180) entering the hollow water vein element 116. As will be discussed further below, this will create turbulent flow within the closed interior space of pod body 111 to promote mixing of the liquid with the beverage material therein. Air will also begin to accumulate at the top of the pod 110, slowly forcing the mixed beverage solution therein downward through exit point 115 into the cup receptacle area 150 that is positioned directly below the mixing chamber 130.

In a non-expanding pod embodiment (beverage pod '110') shown in FIGS. 20 to 23, and referring primarily to FIG. 23, the water jets 106 formed by porting pressurized liquid through the holes 117 shoot directly straight out, with the exception of holes 117 formed on curved surfaces near the bottom of water vein element 116; these jets 106, while shooting straight out radially, are at an angle to the horizontal.

Alternatively, some of these holes 117 may be directed radially out from the side of the water vein element 116, so as to port out outward, (or even downward pointing) such as the holes directly next to the spike 118. Another arrangement of holes may be a combination of radially direct side holes, holes on a rounded surface that project radially out as angled jets, and/or downward water jets creating turbulent flow near the exit point so as to agitate the beverage material additionally upon it exiting the pod 110' further deterring clumping and preventing clogging near the exit point (an example being powder contents 119 in FIG. 23). The beverage material takes up about 66.6% to 80% of the starting volume in pod 110/110' prior to the pod expansion during the mixing process, with about 20-33% of the interior space volume left free for promoting clump-free mixing and deterring material from getting stuck to the top underside surface of the pod 110 or 110'. Additional air is pumped (through a food-grade air filter 181) from the air pump 180 during the mixing process to further force the beverage solution downward and prevent this residue issue. After the water pump 185 has run its full cycle and is turned off, air is pumped (via Y-connector 190 and exit nozzle 135) into the pod 110 or 110' to complete the draining process of the mixed beverage.

As previously noted, the spike 118 is designed to initiate the venting process whereby the mixed beverage exits pod 110 at exit point 115 into the cup which is below in the cup receptacle area 150. Once the mixing process is initiated via the control panel 140, the mixing process will automatically terminate at a certain time interval after initiation. This time internal is dependent on certain user parameters for desired volume of liquid. The proprietary pressures, pod 110/110' form factors and corresponding pump 180, 185 runtimes for each pod type are specifically designed to allow pod 110 (or 110') to be properly pressurized with fluid to promote turbulent flow and mixing, and to ensure the front cover 132 is actuated during closing such that spike 118 punctures the bottom end 114 of pod 110 to create the exit hole 115 for venting.

Referring now to FIGS. 10 and 11, one possible construction for the top end 112 of the pod 110 includes a circular material flange element 104. One method for hermetic sealing of these O-shaped plastic flanges 104 is ultrasonic welding. These mating surfaces of flange 104 has another functional purpose aside from being a platform for centering the water vein element 116, as it also gives the user a surface on which they can rest the pod 110 when placing it into the pod holder 133 prior to lowering the system top cover 131. Flange 104 also provides a flat surface to mount the hermetic seal/pull-tab 108 that will cover the central opening 113 during storage and distribution. At the central opening 113, the pod 110 may be connected to the fluid exit nozzle 135 downstream of the water pump 185 via some type of water tight connector 136 (one example being a such as a nozzle-shaped ring-seal), to provide a liquid-tight seal between the top cover 131, fluid exit nozzle 135 and central opening 113.

In some embodiments pod 110 is intended to be single-use to prevent the potential for bio-contamination caused by improperly cleaned reusable containers. This is especially true for nutritional powders such as protein powder, because a protein powder has a tendency to clump, stick to walls, and otherwise leave a bio-film type residue which a user must physically scrub off.

The single-serving pod-based design of this beverage mixing system is unique to other options for mixing protein powders because our solution requires zero clean-up (aside from recycling/discarding the empty pod). All this is accomplished without any mechanical agitation. Compare this to the GUDPOD™ product, which uses mechanical agitation through an inverted blender-motor. GUDPOD requires this because their solution employs disposable blender tines formed into an ornamental pod-like shape, together with a proprietary cup that must be used with their disposable containers, which needs to be cleaned before every use. Conversely, the present solution does not have any parts that must be cleaned prior to each use, and it works with any cup or bottle provided by the user in cup area 150.

Accordingly, pod 110 with its internal beverage material contents is expandable, single-use and multi-purpose (not just for hydrophilic powders/protein powders, but also may be used for other powdered beverages). Pod 110 serves as the storage/delivery method for the powder, as well as the physical mixing container for the mixing process that produces the single serving of beverage material. It serves as the location for the pressurized water to merge with the powdered beverage material, and its expanding form factor corresponds with system parameters to regulate pressure and promote turbulent flow at the right moment so as to agitate the powder into saturated (and hence dissolved) beverage material without clumping, and then to dispense a mixed beverage solution therefrom. Although there may be slight residue remaining after venting the mixed beverage contents from pod 110 into a cup, (which may be resting on an adjustable height platform in cup receptacle area 150), the turbulent flow provided by the pattern of water jets 106 facilities near-complete mixing, whereby almost all of the contents of the pod 110 are washed out completely upon completion of venting.

In one example, pod 110 may be made of a material such as HDPE and/or LDPE recyclable plastic and may thus be immediately recyclable after preparation of the mixed beverage since there is such minimal residue or contents left in the empty pod after the drink has been made.

In one example construction (see for example in FIGS. 21 and 23), the pod 110 may include a proprietary geometry tip 103 at the bottom end 114 which is specially constructed to create additional turbulence for the mixing of fluids passing through it near the final exit point 115, thus acting like a turbulence generating means or mechanism to improve mixing when fluid is forced over/around it. In this embodiment, the shape of the spike 118 serves this purpose with its relative proximity to exit point 115.

Referring again to FIGS. 14 to 19, the pod 110 may include concave cavities 109A that revert to convex features 109B upon the pod 110 being pressurized by the water pump 185 and the air pump 180 during the mixing process. In this embodiment, the concave form factor is also functionally designed to have a rectangular cross section, which helps to reduce its over footprint and size, decreasing packaging costs and reducing space requirements during storage and transportation. The concave cavity which turns into a convex surface feature also allows space for the internal beverage powder, such as protein powder, to spread out into during the initial mixing process, promoting clump-free mixing that can still occur while achieving the cost saving benefits of lower overall requirements for shipping and storage volumes.

Figure 2:
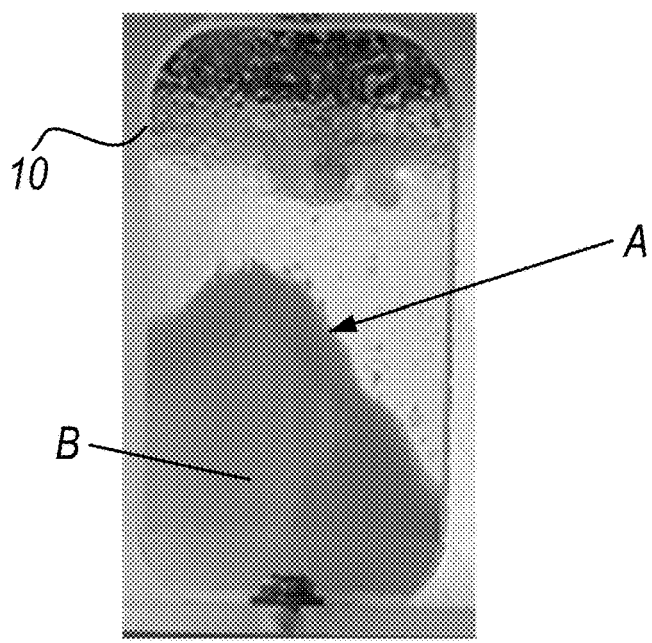
FIG. 2 is a photograph of a similar conventional art test pod after a failed test, where the mixed beverage has not all exited the pod, and a boundary layer has formed due to improper mixing methods or pump pressure/runtime parameters.

Before describing the mixing operation, an overview of the basis for Applicants' mixing is described. Near complete dissolution of the beverage contents or materials (such as protein powder) within the pod 110 is achieved by using the water pump 185 and air pump 180 to create pressure and turbulence inside the pod 110, via water jets 106 exiting the water vein element 116, draining through an exit hole 115 in the bottom of the pod 110 into the cup receptacle area 150 below the mixing chamber 130. An example of a successful mixing process is where substantially all of the powdered contents are removed or exit the pod 110 during the mixing cycle, with the exception of minor residue, particularly in more concentrated volumetric mixtures (which is possible since the user may specify the desired volume of liquid for one serving of powder, which does not change in size based on the liquid volume used). In recalling how large clumps can occur (due to creation of boundary layers (layers of saturated powder next to large areas of non-saturated powder)), this would represent a failed mixing process where the beverage contents would not become fully saturated. This ultimately results in a partially mixed beverage solution, potentially leaving behind completely dry regions of powder behind the boundary layers inside the pod 110 (as shown previously in FIG. 2) and possibly even clogging the exit point 115 of the pod 110. Saturated clumps which are large enough to see but are small enough to fit around spike 118 and exit out of the exit point 115 may also possibly be dispensed into a consumer's glass, and if these clumps are large enough in size that they are noticeable to the consumer while drinking; such would be indicative of insufficient or improper mixing of the final mixed beverage.

Accordingly, bringing the pod 110 to a sufficiently high internal pressure using pressurized water from the water pump 185 and mixed in air from the air pump 180 enables the pressure in the pod 110 to "force saturate" nearly all of the beverage material, such as protein powder, in three (3) seconds or less. The rapid speed of saturation prevents the creation of the aforementioned boundary layers. For hydrophilic powders like protein powder which need a greater amount of water per-weight prior to being fully saturated, the expanding internal volume for the pod 110 was developed to promote natural separation of the powder particles during the moment of saturation (dissolvement). The natural shifting that occurs between powder particles during the pressurized expansion further prevents the occurrence of boundary layers and even also prevents smaller saturated clumps that may be visible to the user in the cup, but not large enough to taste when drinking. At a point during the expansion (see FIG. 18) of the pod 110, a bottom dimple 107 will release off of the spike 118 from its inverted position opening the exit point (see FIG. 19) immediately prior to allowing the outflow of mixed beverage to dispense at exit point 115 from the pod 110. This technique enables successful mixing of the protein powder within the pod 110 without mechanical agitation because it allows the internal pod pressure to grow large enough to saturate the powder before beginning to dispense the mixed beverage into the cup receptacle area 150.

At the time the powder has become fully saturated inside the pod (where it is in a semi-solution, thick slurry type state) but has not been dispensed yet, this signifies the point where it is most prone to dissolve completely with the least amount of further hyrdrodynamic agitation/energy required. Counterintuitively, leaving the powder stagnant in a liquid bath or slurry state for a longer time without further mixing does not help the dissolving process, but rather the stagnant nature of the soaking of the powder creates the aforementioned saturated clumps that can be noticeable to the consumer during consumption and large enough to clog the exit point 115 if not properly avoided. Should the liquid and the powder sit in the pod 110 so as to become stagnant in an attempt to completely saturate the powder, the regions of powder that are furthest away from the water vein element 116 (at the inside corners within the interior space of the pod body 111) would be prone to saturated clumping, and sticking to the pod 110 interior walls causing residue/clumps. Any protein powder residing in detailed areas surrounding the spike 118 and inside the water jet holes 117 may also clump, possibly causing failure during mixing.

The downward facing water jets 106 near the spike 118, created by pressurized water exiting holes 117 (these jets having an angled profile through the body relative to horizontal due to being located on the bottom side of the curved portion of water vein element 116) provide necessary additional agitation at the inside of the pod 110 towards the bottom 114 of pod 110 and around the spike 118 while flowing out exit point 115. This arrangement of holes 117 and water jets 106 created therefrom promotes near-complete mixing of powder in water, much more so than if the downward facing water jets 106 are absent. Without the downward facing jets 106 being pointed at exit point 115, the creation of boundary layers/clumping/clogging in the interior space directly below spike 118 towards the bottom 114 of the pod 110 is almost certain to happen.

Thus, these downward-facing water jets 106 near spike 118, since they are pointed directly out at the exit point 115 and also at the bottom inside corners of the pod 110, help to eliminate problems in an expected area where clumping was commonly observed during tests. Once boundary layers are formed at the bottom end 114 of the pod 110, the exit point 115 often becomes clogged during draining and dispensing of the mixed beverage. The combination of internal pressures, pump 180, 185 run times, exit-point 115 release timing, and form factors of the pod 110 are demonstrative of a well thought out and non-trivial solution, in which the pod 110 could be prone to failure if not executed properly, in particular in the case of mixing hydrophilic/protein powders.

Thus, in the operation as to be described hereafter, the timing of both the force-saturation of the powder and the timing of the release of the bottom end 114 of the pod 110 (at exit point 115) off the spike 118 for venting pod 110 to release the pressure (creating downward turbulent flows) must be rapidly executed and precisely configured down to the second for each of the stages of the mixing process. The whole process generally occurs in less than 10 sec (not including draining) depending on the pod form factor. If the mixing cycle timing is not properly executed (once pressurized water enters the hollow water vein element 116), results will yield clumping or clogging inside the pod 110 at exit point 115. In other words, the pressurization period before venting is both critical to the process and critically timed during mixing initiation so as to prevent saturated clumping inside the pod 110, before pressure release occurs from the punctured hole. Otherwise if the force saturation of powder occurs too slow, or if the powder is left sitting in the water inside pod body 111 for longer than a few seconds, the boundary layers and saturated clumps will form in that short time and the resultant mixed beverage will not be made consistently (without using mechanical agitation) every time. This can easily be demonstrated by simply placing a serving of protein powder in a cup and adding water on top; it instantly becomes difficult-to-remove clumps and boundary layers within seconds of adding the water; this is for every single instance.

Reference again is made to FIGS. 14 to 19 so as to describe a mixing operation of beverage material (such as protein powder) within pod 110. In operation, a user loads a single-serving protein powder pod 110 into the pod holder 133. The top cover 131 is first closed, creating a water-tight seal between the top end 112 of the pod 110 at central opening 113 and the fluid exit nozzle 133 with the nozzle-shaped ring-seal connector 136, potentially made out of a rubber or neoprene material. The front cover 132 is then pivoted to close (FIG. 16); as this occurs the post 138 (see also FIG. 24) of the front cover 132 contacts/raises the bottom end 114 of pod 110 upward (see ramps 139A, 139B, FIGS. 24 and 26) to be punctured by the spike 118, and then falls back down again (FIG. 17) allowing for the bottom 114 to eventually expand outward later (FIGS. 18, 19) under pressure. Accordingly, the pod 110 expands during the mixing process under liquid pressure imparted by the water pump 185 so as to facilitate the mixing of powders prone to clumping by giving the powder a new volume to expand into during the moment of saturation.

Once both covers 131, 132 are closed, the user can make a selection on the control panel 140 to select the desired amount of water to mix with the powder serving, or if the desired amount of liquid is already selected, the user can simply start the mixing process with one touch of a button. The fully recyclable plastic pod 110 contains loose powder (beverage material), and includes the initially-empty hollow water vein element 116 with its puncturing-spike 118 at a distal end.

About 20%-33% by volume within the pod 110 remains empty space to promote successful mixing and prevent residue from sticking to the inside roof of the pod. There is another reason for this too, relating to clumping. To further prevent clumping and clogging at the exit point 115, there must be some additional empty space within the pod 110 that is not filled by protein powder for the powder to expand/shift into during the initial moments of mixing. Conversely, if the pod 110 is filled over 85% by volume with a beverage material such as protein powder, the powder has less (or no) free space to move inside of the pod 110, and Applicants have determined through testing that stagnant protein powder (albeit semi-saturated or not) sitting in liquid quickly becomes highly prone to clumping. This also means that there is a lower initial volume of water entering the pod 110 prior to it reaching the force-saturation pressure, because the incompressible nature of the powder with no air causes a sufficient back-pressure against the water/air pumps such that the incoming water flow rate greatly decreases after one short initial burst. If the powder is reasonably compressed during the time of attempted force saturation, saturated clumps are more likely to occur, and the water jets will only serve to have an effect at slowly dissolving/eating away the outside portions of the compressed powder instead of properly mixing all of the powder particles in.

The result therefore of the pod 110 being over 85% filled with powder is that the powder molecules move/shift less within the actual pod 110 during mixing, and the presence of pressure-packed pockets of powder (not to be mistaken with internal pressure created in the pod 110) greatly contribute to clumping. For hydrophilic powders to mix effectively without being physically broken up by a mechanical agitator, these powders must be able to expand and the particles be allowed to naturally separate otherwise they will often result in uneven and unpredictable clumping patterns created by uncontrollable slight variations in the regional relative-density within the powder. The powder displaces itself upon the initial pressurized liquid (such as water) entering the pod 110, and since the powder naturally tends to float, the powder towards the bottom naturally spreads itself out inside of the pod 110 during the water pumping process.

Figure 14:
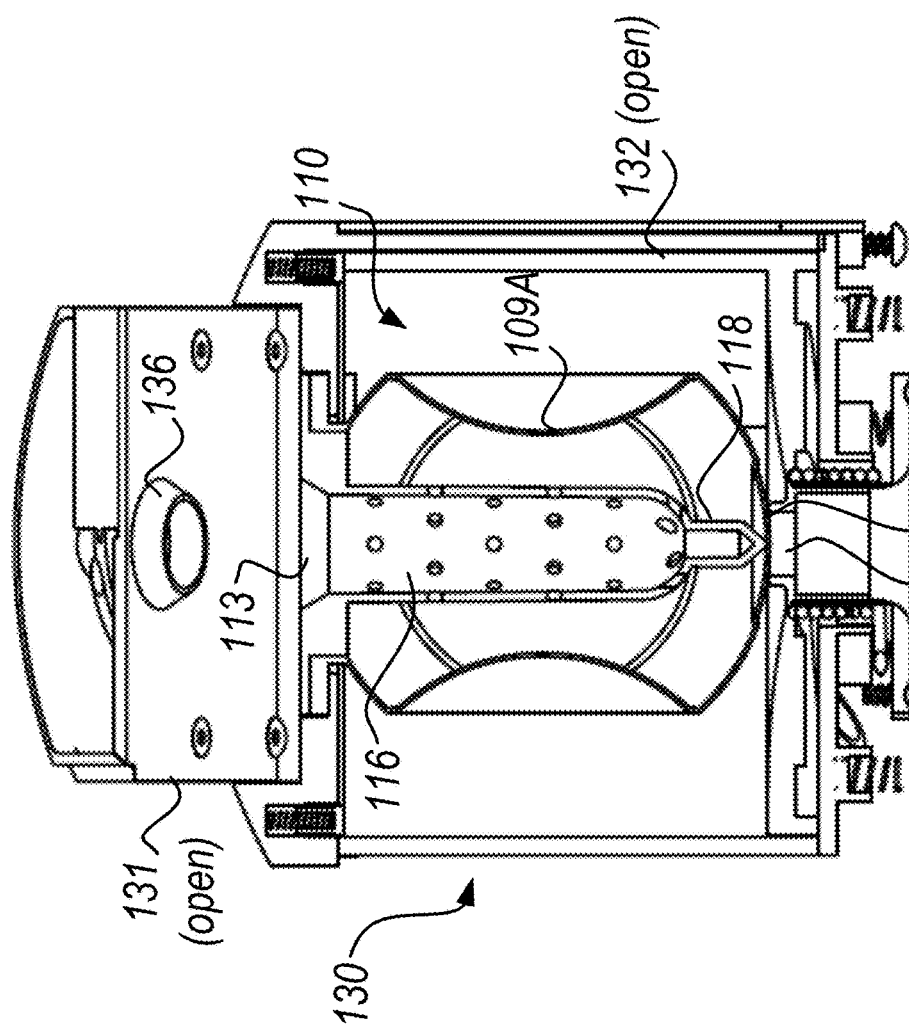
FIG. 14 is a partial cross-sectional view taken across line D-D of FIG. 2 to illustrate additional components of the mixing chamber in more detail.

As to the mixing operation, the cross-sectional view in FIG. 14 shows a start position, with the hollow water vein element 116 attached within pod 110 and aligned with the central opening 113, such that the spike 118 is able to puncture cleanly through the bottom end 114 of pod 110 creating the exit hole 115. Water is introduced from the water pump 185 suctioning water out of removable primary reservoir 120 and porting it through its water line up to the Y-Connector (190—see FIG. 5) out the fluid exit nozzle 135 into the water vein element 116 via central opening 113. The fluid exit nozzle 135 is connected to or otherwise aligned with central opening 113 on the top half of the pod 112 such that a nozzle-shaped ring-seal 136 forms a water-tight seal between the pod entry point 113 and the fluid exit nozzle 135. This water is under pressure and fills the hollow water vein element 116, with water jet streams 106 created as the water exits via holes 117. The internal pod pressure causes the concave cavity 109A walls of the expandable pod 110 to protrude outward into a convex feature 109B form factor (or spherical form factor), giving the powder new space to move into as it mixes with the incoming liquid prior to being dispensed out exit point 115.

The water pump 185 fills the pod 110 with fluid and the internal pod 110 pressure causes all of the loose beverage material (such as protein powder) to be forcefully saturated within the initial seconds of the water pump running. Simultaneous to the powder becoming forcefully saturated, the expandable side walls of the pod body 111's internal cavity pop outward under the internal pressure of the incoming liquid.

With occasional reference to FIGS. 24-27, the cover 132 is almost but not fully closed (see also FIG. 16) and rides up vertically, driven by ramps 139A on its underside and pushes upwards via post 138 against the bottom 114 of the pod 110 so that the spike 118 is forced to puncture through the bottom 114 of the pod 110 to create the exit point 115 for venting.

Figure 17:
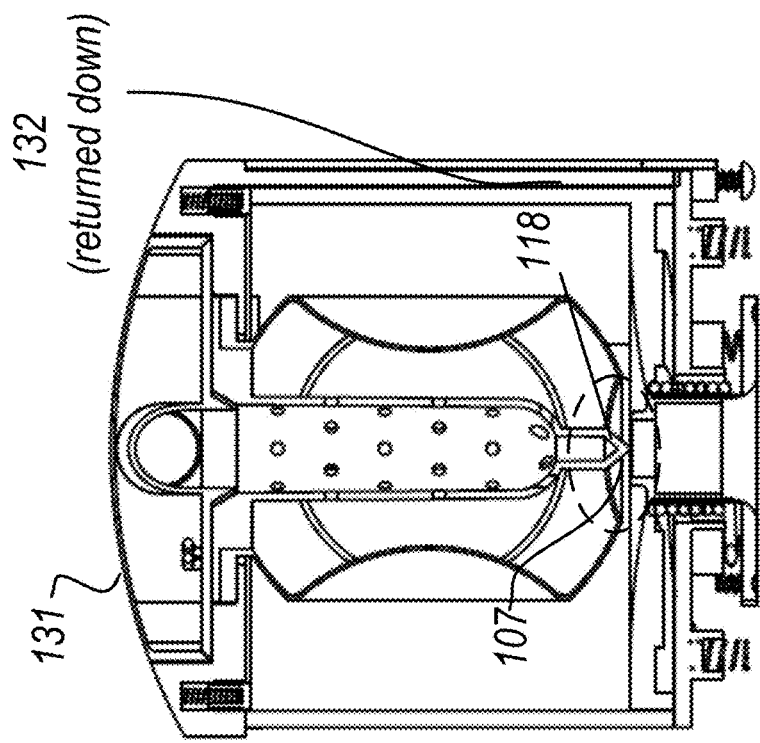
FIG. 17 is yet another cross-sectional view similar to FIGS. 14 to 16 but with the front cover 132 of the mixing chamber 130 fully closed, the front cover 132 having returned to its original position, the bottom dimple 107 remaining inverted.
Figure 16:
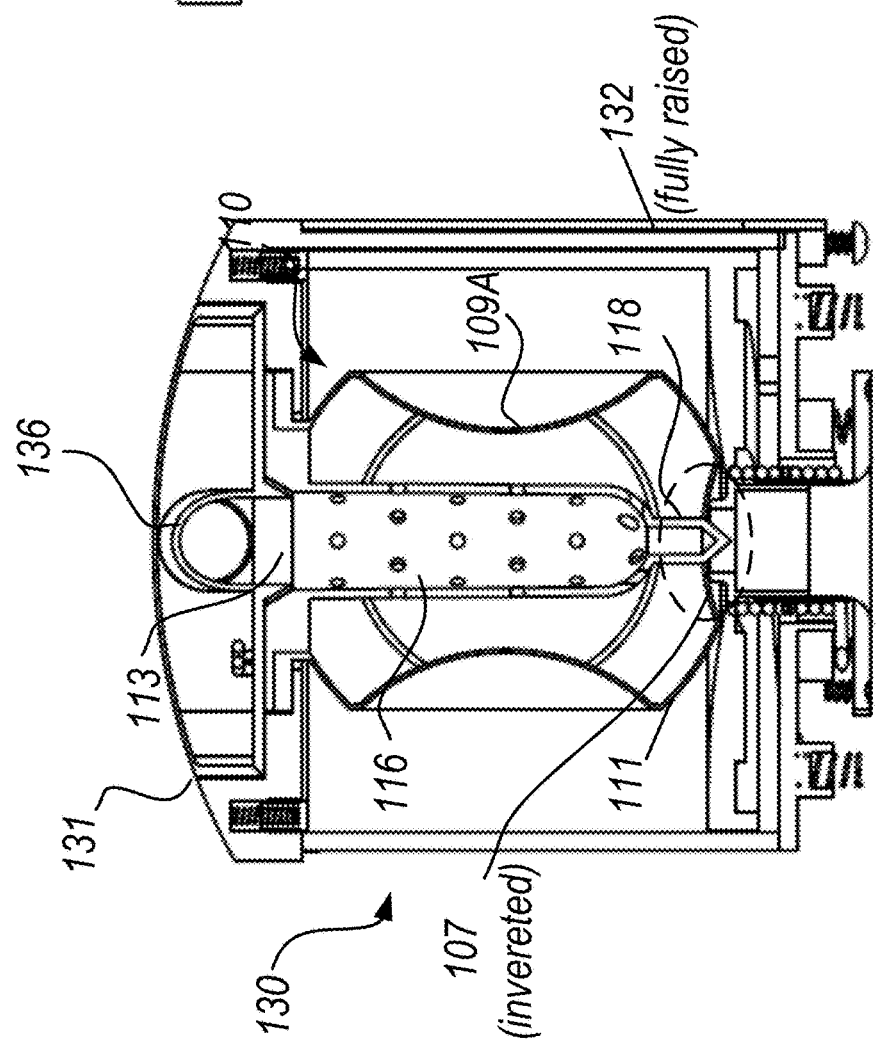
FIG. 16 is another cross-sectional view similar to FIGS. 14 and 15 but with the front cover 132 almost fully closed and at its upraised height, whereby the bottom dimple 107 of the pod 110 has been inverted such that causing the spike 118 creates the exit hole 115.

With reference to FIG. 17, front cover 132 then releases downward (once front cover 132 is fully closed, locking into position against the opening latch ramps 139B) again to ensure that the bottom end 114 of the pod 110 at exit point 115 can release and allow dispensing the beverage so that the internal pod 110 pressure does not come to pressure-equilibrium with the pump, which would stop/start the flow of liquid, often resulting in an improperly mixed beverage.

Namely, the underside ramps 139A on base 137A of the front cover 132 travel up symmetrical but-opposite to cooperating ramps 139B on the mating base 137B directly below it (called the opening latch assembly 160). At the highest point of the ramps 139A/B contact, the front cover 132 is raised up vertically a sufficient distance to invert the bottom dimple-shaped feature 107 of the pod 110 (see any of the sectional views in FIGS. 16-18), creating exit hole 115. There is some slight pressure leakage around the spike 118 and exit point 115 with the spike 118 extended through the bottom end 114 of the pod 110, but it does not functionally impact the efficacy of the pressurization process during saturation of the powder.

The internal pressure inside the pod 110 grows to a point where the bottom of the pod 114 is pushed downward/outward again so that the spike 118 is quickly retracted from the exit point 115, as shown best in FIG. 18 (before) and FIG. 19 (after). This facilitates the initial significant flow rate of mixed beverage out of the pod exit point 115. Moreover, the retraction of the dimple feature 107 at the bottom end 114 of pod 110 as the spike 118 is retracted from the exit hole 115 releases pressure facilitating additional turbulent flow in the previously unoccupied volume around the profile of the spike 118 and around bottom end 114 in the interior space of pod body 111 via the downward facing water jets 106 formed out radial holes 117, which further agitate the newly saturated powder. The rapidly mixed beverage fluid (due to turbulent flow of the pattern of water jets 106 emitted from the holes 117 on water vein element 116) exiting through the vent path created at exit point 115 by the spike 118 causes turbulent flow in the water that mixes the saturated powder into a uniform liquid solution (suspended-solution) that is dispensed as the mixed beverage drains into the user's cup below in cup receptacle area 150. The water pump 185 also stops at the end of the mixing period based on the desired liquid volume selected by the user, which removes pressure that is then compensated for by the air pump 180 which runs until the pod 110 has drained fully and no longer has any liquid contents remaining.

Accordingly, there are two separate turbulent flow conditions that promote complete mixing: (a) the turbulent flow generated by the radial holes 117 and the downward/outward water jets 106 exiting water vein element 116, and (b) the turbulent flows created by the rapidly displaced material and the mixed beverage exiting from inside of the pod 110 that begins immediately after the spike 118 is retracted from the exit hole 115 made via puncturing the bottom 114 of the pod 110. The turbulence provided by the pressurized flowing water in both conditions thus results in an energy substitute for mechanical agitation, which is not employed in system 100. As such, the system 100 and/or pod 110 does not require the use of any mechanical agitation mechanism, as opposed to many prior art beverage forming systems—(mechanical agitation examples including blenders, shaking bottles, whisk balls or using stirring techniques) inside or external to housing 105 to achieve sufficient mixing of a beverage. The system 100 also does not require any heat energy to mix or physical energy to be supplied by the user or by other external powered means.

The pressurization of water to create the turbulence conditions thus replaces mechanical agitation, while recreating predictable scenarios of fluid dynamics within the pod 110 on a consistent basis so that adequate mixing is consistently ensured. The placement and patterns of the water jets 106 via holes 117 in the water vein element 116 are thus strategically distributed across the entire inner volume of the pod 110. Therefore, within the pod 110 additional turbulent flow is created by the forced water flow around the spike 118 at the bottom 114 of the pod, in addition to that caused by the pattern of water jets 106, to substantially mix the beverage material and liquid.

Moreover, the cup filling time with mixed beverage, upon initiation of the mixing process, is variable depending on the composition of the beverage material within the closed interior space of the body 111 of pod 110 and the expandable form factor of the pod 110.

In one example, a portion of (or all of) the pod 110 may be composed of thin food-safe vacuum formable, blow-moldable, or injection molded plastic(s). In an example, the top half of the pod 112, including water vein element 116 with spike 118 may be a singular piece via injection molded plastic materials and the like. In an example, the plastic may be malleable so that the whole pod 110 is capable of plastically deforming and rebounding by a small amount, but the distal tip/spike 118 of the water vein element must be stiff enough to puncture the bottom 114 of the pod 110. The pod 110 remains sealed throughout the entire mixing process in every place but the punctured exit point 115. An easily removable hermetic seal 108, such as a thin tin foil or paper seal may be used to protect and maintain the opening 113 to keep the water vein element 116 protected and food-safe during storage and distribution.

The example embodiments having been described; it is apparent that such have many varied applications. For example, in an alternative construction, an additional (user-washable) agitation piece may be added to the beverage forming system 100 at the bottom of the mixing chamber directly below the pod exit point 115. This piece would serve to further mix the fluid solution as liquid dispenses out of the pod and into the consumer's cup. This optional piece creates additional agitation of the mixed beverage prior to releasing it into the cup. This "agitation piece" may be designed with the intent of creating more turbulence in the fluid solution, which in turn increases the "creamy" flavor naturally exhibited by the flavor profiles of most protein powders when extremely well mixed. When over-mixed, protein powder beverages will foam and bubble, which makes it difficult for the user to drink right away or quickly (due to the high air content), so getting the proper amount of turbulence by using the agitation piece is desirable. One example of this additional piece may be an element or article having a grid-like pattern, such as a turbulence grid or a sieve, and/or several stacked onto each other within a compact 1" cubic space so as to generate a thicker or creamier mixed beverage due to the additional mixing by the agitation piece. The presence of such a turbulence grid utilizes fluid dynamics to create energy, just like the pod internal design does, and thus does not constitute mechanical agitation since the agitation piece of the beverage forming system 100 has no mechanical motion during mixing. The presence of the agitation piece is not required, and would introduce an optional embodiment where the user would then have to clean or thoroughly rinse one easily removable attachment piece (the agitation piece) after using the product to mix a beverage.

In another example, system 100 may be configured to include or incorporate a cooling element which chills the water prior to it entering the mixing chamber 130. Examples may include use of a peltier cooler and/or a small refrigerated reservoir. Consumers of protein beverages often prefer them cold, and often describe that the perceived taste is improved when the beverage is cold.

While the example embodiments describe the beverage material as a protein powder drink substance packaged into a pod 110, the interior dry contents of pod 110 could alternatively include any of sugared powdered drinks, kids' drinks, energy powders, melatonin (and other sleep-aid) powders, baby formula powders, pre-workout and post-workout formulas, other nutritional supplements, and vitamin substances, etc. The mixing time periods and form-factor of the pod body 111 may vary, depending on the type and composition of beverage material within the interior of pod body 111. This is because the composition of some beverage materials may have particles that may be easier to mix or dissolve, or where some powders may be more hydrophilic than others, thus potentially requiring more or less time and custom parameters during mixing and saturation process to properly mix the beverage and allow it to vent via exit hole 115. Applicants anticipate cup fill times being in a range between 2-4 seconds after the mixing button is pressed before the draining begins initially, and up to 30 seconds before the draining process is completed.

In an alternative example, the beverage material in pod 110 may include a liquid soluble concentrate instead of a powder which is mixed using the process described above. This is in contrast to conventional post-mix machines commercially available because the water/liquid is being introduced to a fully self-enclosed container for mixing to occur inside the pod 110, which already contains the liquid concentrate in a single-serving amount, as opposed to using a metered-mixing approach.

In another alternative example, the beverage material in pod 110 may include an oil concentrate or other liquid non-soluble contents for complete dispersal to create an insoluble mixed solution prior to dispensing it into the user's cup, while leaving only minimal residue inside of the pod 110. Various oil concentrates can be used to deliver a number of benefits, and because many are not water soluble or not easily dissolved/diluted, a custom designed pod and water vein element could be implemented for the proposed embodiment to mix the two insoluble solutions without mechanical agitation.

Although the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures to those claimed, whether or not such alternate, interchangeable and/or equivalent structures disclosed herein, and without intending to publicly dedicate any patentable subject matter.

We claim:

1. A pod for use with a protein powder-based beverage forming system, the pod containing protein powder typically subject to clumping within the pod upon mixing the protein powder with a liquid therein, the beverage forming system including a liquid reservoir, a liquid pump having an intake line connected to the liquid reservoir and an exit line providing pressurized liquid and connectable to the pod at a top end of a mixing chamber of the system where the pod is loaded therein for use in forming a mixed protein beverage, the pod comprising:

a rigid body defined by a top end, a bottom end, and having a hollow interior containing the protein powder to be mixed with liquid pressurized by the liquid pump, and an elongate, hollow water vein element disposed inside the hollow interior of the body, an upper end of the water vein element connected to an opening at the top end of the body that, when connected at the top end of the mixing chamber and upon initiation of a mixing process, provides access for the pressurized liquid to flow into the body hollow interior via the water vein element, wherein the water vein element further includes:

a plurality of holes arranged in spaced relation to one another along a longitudinal plane of the water vein element from top to bottom thereof, as well as around a circumference of the water vein element from top to bottom thereof, such that the pressurized liquid flowing down through the top of the pod into the water vein element exits through the plurality of holes in a pattern of water jets, thereby creating turbulent flow to saturate the protein powder and form the mixed protein beverage while minimizing or reducing clumping thereof within the hollow interior of the pod body, and an exit hole provided in the bottom of the pod, the exit hole serving as a vent path through which the mixed protein beverage vents into a cup arranged beneath the mixing chamber of the beverage forming system, wherein the pod is not subject to any source of enhanced vibrations or agitation that is external to the pod body to induce mixing of the protein powder with the liquid therein so as to create the mixed protein beverage.

2. The pod of claim 1, wherein the pressurized liquid is mixed with the protein powder within the hollow interior of the pod body for a given number of seconds before the mixed protein beverage is vented via the exit hole into the cup.

3. The pod of claim 1, wherein a cup filling time with mixed protein beverage upon initiation of the mixing process is variable depending on the composition and amount of the protein powder within the pod body hollow interior.

4. The pod of claim 3, wherein the cup filling time is in a range of 2-30 seconds upon initiation of the mixing process.

5. The pod of claim 1, wherein the protein powder takes up at least two-thirds but less than or equal to 80% of the total volume of the hollow interior space.

6. A beverage forming system, comprising:
a housing,
a mixing chamber accessible on the housing for loading a pod containing beverage material therein, the mixing chamber connected to a source of pressurized liquid in the housing, and
a platform in the housing for supporting a cup directly beneath the mixing chamber, the pod further including:
a body with a top end, a bottom end, and an interior space subject to pressurization from the pressurized liquid entering into the interior space via the top end of the body, with beverage material provided in the interior space, the body further including a water vein element extending into the interior space and having an upper end adapted to be coupled to the source of pressurized liquid at the mixing chamber, the pressurized liquid entering through the top end of the body into the water vein element, the water vein element further including:
a plurality of holes arranged in spaced relation to one another along a longitudinal plane of the water vein element from top to bottom thereof, as well as around a circumference of the water vein element from top to bottom thereof where, upon initiation of a mixing process, the pressurized liquid flows downward through the top of the pod into the water vein element and exits the plurality of holes as a pattern of water jets inducing turbulent flow so as to mix the beverage material, and
an exit hole provided in the bottom end of the pod body, the exit hole serving as a vent path through which the mixed protein beverage vents downward through the interior of the pod body into the cup.

7. The beverage forming system of claim 6, further comprising an air pump that provides additional air pressure to the pod along with the pressurized liquid into the pod so as to assist with draining of the pod.

8. A beverage pod arranged for use in a beverage forming machine to make a mixed beverage from a beverage material typically subject to clumping within the beverage pod upon mixing the beverage material with a liquid, comprising:
a container having a top end, bottom end, and an interior space,
the beverage material usable to form a mixed beverage by interaction of the beverage material with a pressurized liquid introduced via the top end of the container into the interior space upon initiation of a mixing process, and
a turbulent flow creating structure arranged within the interior space to cause mixing of the beverage material upon the pressurized liquid entering the interior space, wherein mixing occurs in response to a pattern of water jets exiting the turbulent flow creating structure into the interior space at multiple different angles and locations relative to surfaces of the turbulent flow creating structure, so as to rapidly saturate the beverage material before clumps form,
the container further including an exit hole at the bottom end thereof, the mixed beverage vented through the exit hole into a cup arranged beneath the beverage pod of the beverage forming machine.

9. The beverage pod of claim 8, wherein
the turbulent flow creating structure includes an elongate, hollow water vein element,
the top end of the container has a central opening which connects the water vein element to the pressurized liquid, and a removeable seal tab serving as a closure over the central opening.

10. The beverage pod of claim 8, wherein a cup filling time with mixed beverage upon initiation of the mixing process is variable.

11. The beverage pod of claim 10, wherein the cup filling time is in a range of 2-30 seconds upon initiation of the mixing process.

12. The beverage pod of claim 8, wherein the beverage material takes up at least two-thirds but less than or equal to 80% of the total volume of the interior space.

13. The beverage pod of claim 8, wherein
the pressurized liquid is pumped into the interior space of the container pod in a first cycle, and
upon completion of the first cycle, pressurized air is ported through the mixing chamber and container top end into the interior space in a second cycle to force any remaining beverage material mixing with the pressurized liquid downward toward the exit hole, so as to prevent clogging of the exit hole and deter any clumping residue still within the interior space of the container.

14. The pod of claim 1, wherein the plurality of water jets exiting the plurality of holes due to the pressurized liquid include multiple water jets shooting radially outward at multiple locations from sides of the water vein element, multiple water jets shooting at an angle downward relative to a horizontal plane through the water vein element sides toward the pod bottom end, and multiple water jets shooting directly downward towards the exit hole at the bottom end of the pod.

15. The pod of claim 1, wherein
the beverage forming system further includes an air pump configured to provide pressurized air through the mixing chamber and pod top end into the hollow interior of the pod body, the pressurized air ported into the hollow interior after completion of a pressurized liquid cycle, and
the pressurized air adapted to force the protein powder mixing with the liquid downward toward the exit hole so as to prevent clogging of the exit hole and to deter any clumping residue still within the hollow interior of the pod body.

16. The beverage forming system of claim 6, wherein the pod is not subject to any source of enhanced vibrations or agitation that is external to the body of the pod to induce mixing of the beverage material with the liquid therein so as to create the mixed beverage.

17. The beverage forming system of claim 6, further comprising:
an air pump configured to provide pressurized air through the mixing chamber and pod body top end into the interior space, the pressurized air ported into the interior space after completion of a pressurized liquid cycle, and
the pressurized air adapted to force the beverage material mixing with the liquid downward toward the exit hole so as to prevent clogging of the exit hole and to deter any clumping residue still within the interior space.

18. The beverage forming system of claim 6, wherein the plurality of water jets exiting the plurality of holes due to the pressurized liquid include multiple water jets shooting radially outward at multiple locations from sides of the water vein element, multiple water jets shooting at an angle downward relative to a horizontal plane through the water vein element sides toward the pod bottom end, and multiple water jets shooting directly downward towards the exit hole at the bottom end of the pod.

19. The beverage pod of claim 8, wherein the beverage pod is not subject to any source of enhanced vibrations or agitation that is external to the container of the pod to induce mixing of the beverage material with the liquid therein so as to create the mixed beverage.

20. The pod of claim 8, wherein the plurality of water jets exiting the plurality of holes due to the pressurized liquid include multiple water jets shooting radially outward at multiple locations from sides of the water vein element, multiple water jets shooting at an angle downward relative to a horizontal plane through the water vein element sides toward the pod bottom end, and multiple water jets shooting directly downward towards the exit hole at the bottom end of the pod.

21. The beverage pod of claim 8, wherein the container is expandable.

\* \* \* \* \*